V. CAPOBIANCO.
NON-REFILLABLE BOTTLE.
APPLICATION FILED MAR. 7, 1912.
1,103,348.
Patented July 14, 1914.
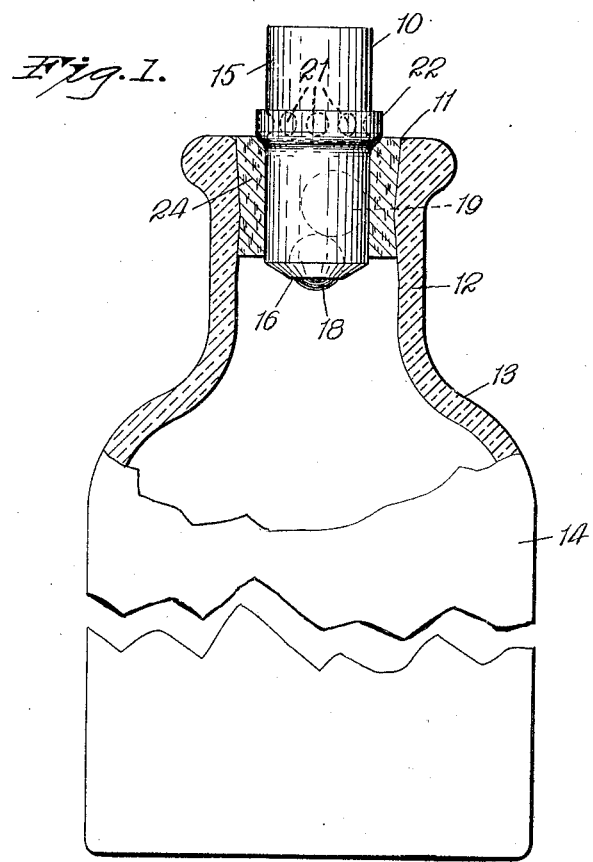
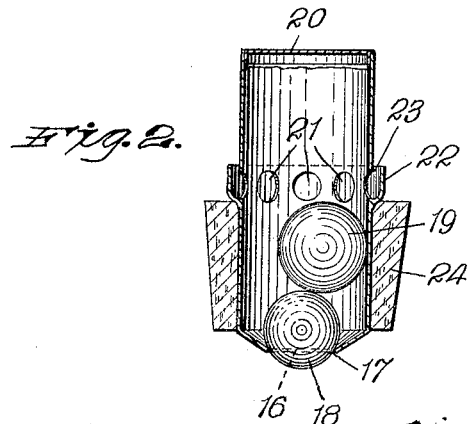
Witnesses:
Charles C. Abbe
E. M. Jerke
Inventor
Vincent Capobianco
By his Attorney
N. T. Criswell

UNITED STATES PATENT OFFICE.

VINCENT CAPOBIANCO, OF NEW YORK, N. Y.

NON-REFILLABLE BOTTLE.

1,103,348.  Specification of Letters Patent.  Patented July 14, 1914.

Application filed March 7, 1912.  Serial No. 682,323.

*To all whom it may concern:*

Be it known that I, VINCENT CAPOBIANCO, a citizen of the United States, and a resident of New York, borough of Brooklyn, county of Kings, and State of New York, have invented a certain new and useful Improvement in Non-Refillable Bottles, of which the following is a full, clear, and exact specification.

This invention relates to a class of devices adapted to prevent a bottle from being refilled when its contents has been emptied therefrom.

My invention has for its object primarily to provide a device designed to be employed in conjunction with a bottle of any preferred form for preventing it from being refilled after the liquid therein has been emptied, or preventing the contents of the bottle from being diluted or contaminated by foreign substances, and this is accomplished mainly by providing a device which is applied in the mouth of the bottle after it is filled and wherein is employed a ball-valve which serves to permit the liquid to be poured from the bottle when tilted so that its mouth is on an incline of any angle and which is forced upon its seat for closing the opening when the bottle is held so that its mouth is on any upwardly disposed angle.

Another object of the invention is to provide a weighted element which serves to move the ball-valve in a direction to close the opening of the bottle when disposed so that its neck is above the level of the axial center thereof; and a further object of the invention is to provide means which will effectually prevent the insertion of a wire or the like in the device for the purpose of unseating the ball-valve when closing the opening of the bottle.

A practical embodiment of the invention is represented in the accompanying drawing forming a part of this specification in which similar characters of reference indicate corresponding parts in all the views, the said invention being more fully described hereinafter and then pointed out in the appended claim.

In the drawing, Figure 1 is an elevation of a bottle, partly broken away and partly in section, showing one form of device embodying my invention applied thereto, and Fig. 2 is a sectional view of the device, parts of which are shown in detail.

The device 10 may be of any suitable shape or size so as to be inserted in the mouth 11 of the neck 12 of the usual or any preferred type of bottle 13 having a body 14.

The device has a casing 15 which is preferably cylindrical in shape preferably made of glass, or analogous substance and integrally formed, or it may be made of cast or sheet metal. The lower end of the casing 15 is tapered so as to provide an opening 16 of smaller diameter than the casing proper, and which forms a valve-seat 17 upon the inner edge of the opening 16. The valve-seat 17 is adapted to receive a ball-valve 18 which is freely movable within the casing 15 and serves to close said opening against the passage of liquid therethrough. Also in the casing 15 is a freely movable weighted element or ball 19 which is of larger diameter than the ball-valve 18 so that when revolved to contact with the ball-valve 19 said valve will be moved upon its seat 17 on tilting the bottle so that the neck thereof will be below the level of the axial center of the bottle, and the bottle will then be closed against admission of the liquid therein.

When the ball-valve 18 and the ball 19 are placed in the casing 15 through the top thereof its opening is closed by a plate 20, or otherwise. Approximately midway of the casing 15 are a plurality of alined spaced openings 21 through which the liquid flows when poured from the bottle through the opening 16. A ring or concentric flange 22 is provided upon the casing adjacent to the lower edge of the openings 21, and said flange is of sufficient width to extend to the upper edges of said openings, or to a suitable distance thereabove. The upper part of the concentric flange 22 is outwardly curved so as to be spaced from the wall of the casing whereby an annular groove or slot 23 is provided so as to permit the liquid to flow after passage through the openings 21, and which also serves to prevent the insertion of a wire, or other article, through said openings for the purpose of unseating the ball-valve when in position to close the opening 16 of the casing, thereby preventing the bottle from being refilled after the liquid therein has been emptied, or preventing the contents of the bottle from being diluted, or contaminated by foreign substances. The device is preferably made somewhat smaller than the opening of the neck of the bottle, in order to permit it to be held in an opening provided in a suitable stopper, as 24, which may be made of rubber, cork, glass, or other material, and sealed in the neck of the bottle in any desired manner.

In the foregoing description I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

In a non-refillable bottle, the combination with a bottle of a cylindrical casing having a tapered lower end said end being partially closed whereby a seat is formed for a valve, and said casing being secured in the neck of the bottle a valve comprising a small ball of light substance adapted to rest within the cylinder whereby the said opening in the tapered end part is closed, a larger heavy ball surmounting the small ball adapted to serve as a weight and a driver, whereby a close contact is maintained between the small ball and the opening in the end part, said balls being of such a size that they cannot exchange relative positions within the cylindrical casing, a cap adapted for closing the top of the cylindrical casing, and centrally in the walls of the casing a plurality of alined apertures peripherally disposed, and a flange extending from the exterior surface of the casing and having integrally formed therewith a concentric band whereby a channel is provided extending peripherally around the cylindrical casing, having its base immediately below the said openings, and the upper edge of said band extending above the openings, substantially as shown and described.

This specification signed and witnessed this fifth day of March A. D. 1912.

VINCENT CAPOBIANCO.

Witnesses:
ROBT. B. ABBOTT,
E. M. JERKE.

Copies of this patent may be obtained for five cents each, by addressing the "Commissioner of Patents, Washington, D. C."